Nov. 12, 1940.   H. O. DROTNING   2,221,021
CENTERING SPRING FOR RANGE FINDER BRACKETS
Filed July 1, 1939
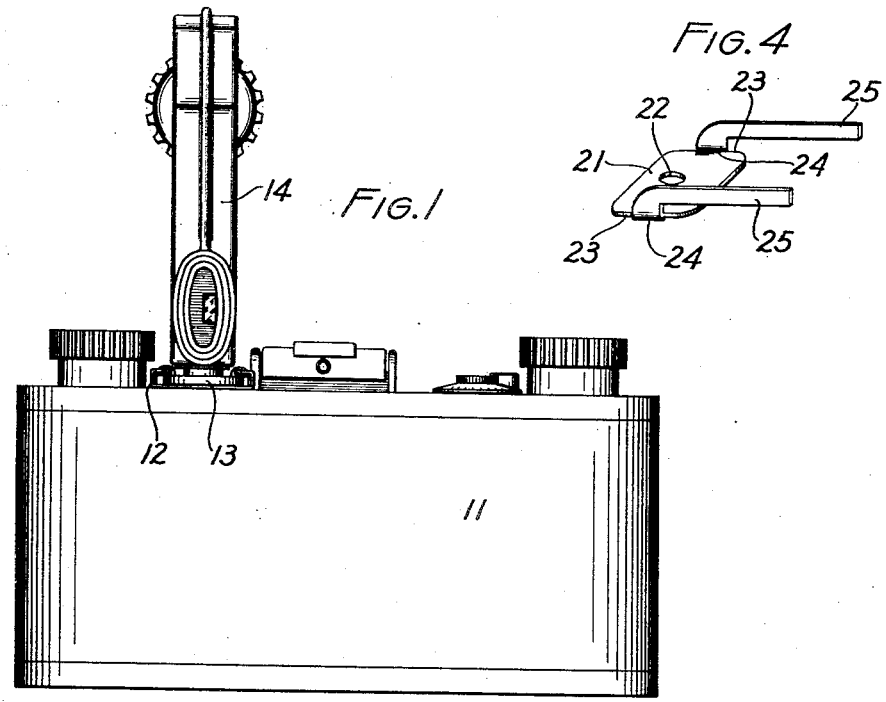
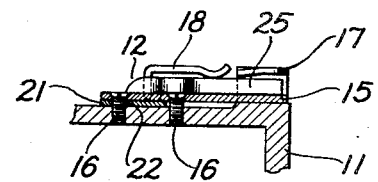
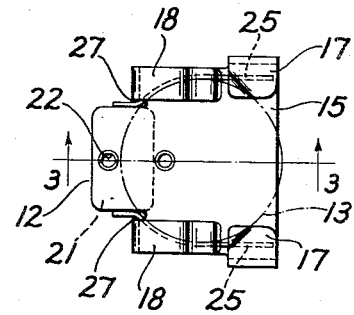
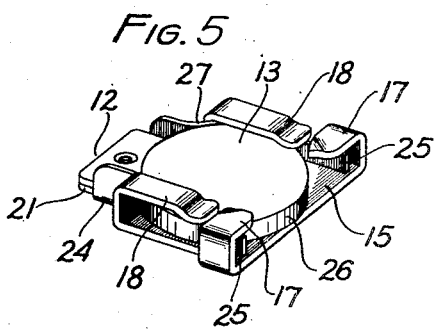
HENRY O. DROTNING
INVENTOR
BY
ATTORNEYS Patented Nov. 12, 1940

2,221,021

UNITED STATES PATENT OFFICE 2,221,021

CENTERING SPRING FOR RANGE FINDER BRACKETS

Henry O. Drotning, Rochester, N. Y., assignor to Eastman Kodak Company, Rochester, N. Y., a corporation of New Jersey Application July 1, 1939, Serial No. 282,507

4 Claims. (Cl. 24—259)

The present invention relates to roll film cameras, and more particularly to a bracket for detachably mounting a pocket range finder in position on the camera.

One object of the invention is the provision of a centering spring for retaining the range finder in proper position on the range finder bracket.

Another object of the invention is the provision of a spring of this class which adopts the bracket for use with a wide variety of range finders of the pocket type.

A still further object of the invention is the provision of a centering spring which may be readily and easily applied to existing range finder brackets.

Yet another object of the invention is the provision of a centering spring which when secured in position on the bracket, not only properly positions and centers the range finder on the bracket, but also protects the parts of the bracket from accidental bending or breaking.

Still another object of the invention is the provision of such a centering spring which is extremely simple in construction, inexpensive to manufacture, easy to apply, and highly effective in use.

To these and other ends, the invention resides in certain improvements and combinations of parts all as will be hereinafter more fully described, the novel features being pointed out in the claims at the end of the specification.

In the drawing:

Fig. 1 is a rear view of a roll film camera of standard construction, showing the relation thereto of a bracket for mounting a range finder of the pocket type;

Fig. 2 is a top view of the range finder bracket showing the relation thereto of a centering spring constructed in accordance with the present invention, and also showing the arrangement by which the spring both centers and positions the range finder base on the bracket;

Fig. 3 is a vertical sectional view through the range finder bracket, taken substantially on the lines 3—3 of Fig. 2, showing the arrangement for securing the centering spring thereto;

Fig. 4 is a perspective view of the preferred form of centering spring; and

Fig. 5 is a perspective view of the range finder bracket with its centering spring, showing the relation of the various parts.

Similar reference numerals throughout the various views indicate the same parts.

The drawing shows a camera of standard construction comprising a body portion 11 to which is secured a range finder bracket, generally indicated by the numeral 12, arranged to engage the base 13 of a pocket range finder 14 to detachably secure the latter in position on the camera. The bracket 12 is formed from a strip of sheet material, preferably metal to provide a flat plate portion 15 which is secured to the camera body portion 11 by means of screws 16, or other suitable fastening means.

The material of the portion 15 is bent up to form a pair of spaced lugs 17 positioned adjacent the front of the bracket 12, and a pair of forwardly extending spring fingers or clips 18 which cooperate with the lugs 17 and the plate 15 to engage the finder base 13 to detachably secure the finder on the camera body, as is well known.

The range finder 14 is detachably mounted on the camera by sliding the base 13 thereof under the lugs 17 and the clips 18, as illustrated in Fig. 5, the base 13 then being securely held in position by reason of the cooperating lugs 17 and clips 18, as is well known. It has been found, however, that various makes of pocket range finders are formed with bases which vary materially in size. For this reason, considerable difficulty has been experienced in mounting these various range finders on a bracket of the type above described which is primarily designed for a particular type of range finder. In the case of smaller base range finders, the base may be inadvertently positioned on the bracket so that it is considerably off center, with the result that the finder is not adequately supported on the bracket so that any slight accidental tipping of the finder 14 may tend to break or bend the lugs 17 or the clips 18. Furthermore, these various size bases present the difficulty of properly centering and positioning the range finder on the bracket 12.

In order to overcome these difficulties, the present invention provides an auxiliary centering spring which may be mounted on the range finder bracket. This spring is positioned to engage the range finder base to both center and position the latter on the plate 15 so as to adapt the bracket to a wide variety of detachable pocket range finders. This centering spring is formed from a strip of thin metal to provide a flat portion or washer 21 which may be slid under the rear end of the plate 15, as shown in Figs. 2 and 3, and is held in position thereon by the rear plate securing screw 16 which passes through a registering aperture 22 formed in the washer 21. This washer provides a simple yet highly effective means for securing or mounting the centering spring on the range finder bracket 12. The opposite edges 23 of the washer are formed with integral strips which are bent on the lines 24 to provide a pair of spaced leaf springs 25, of the shape best shown in Fig. 2, which extend in substantially parallel relation along the opposite sides of the bracket 12, as shown in Fig. 2.

These leaf springs 25 thus provide resilient or flexible bracket side walls which are arranged to engage the sides 26 of the range finder base 13 to accurately center the base laterally on the plate 15 of the bracket, as is apparent from an inspection of the drawing. These leaf springs are formed, adjacent the washer 21, with offset portions 27 with which the base of the range finder is adapted to abut to limit the rearward movement of the base 13 to position the latter longitudinally on the plate 15. This auxiliary centering spring thus adapts the range finder bracket for use with a wide variety of detachable range finders, and properly and accurately centers and positions the finder on the bracket. In addition, the springs 25 extends under the resilient clips 18, as best shown in Figs. 3 and 5, and thus supports the latter to prevent accidental bending down thereof when the range finder is detached from the bracket, the advantages of which will be apparent to those in the art.

It is thus apparent from the above description that the present invention provides an auxiliary centering spring which may be readily and easily applied to a range finder bracket to adapt the latter for use with a wide variety of pocket range finders. This centering spring resiliently engages the range finder base to accurately center and position the base on the finder bracket, yet permit ready and easy removal of the finder when desired. In addition, the springs have portions thereof which extend under the flexible clips of the bracket to prevent accidental bending down of the clip when the range finder is detached.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention and the scope of the appended claims.

I claim:

1. A range finder bracket adapted to be mounted on a camera and to engage a base portion of a range finder to detachably secure the latter to said camera, comprising a pair of resilient members positioned on and extending in substantially parallel relation along opposite sides of said bracket and arranged to engage the base portion to both position and center said portion on said bracket, and a flat washer integral with and connecting ends of said resilient members and secured to said bracket to retain said resilient members in position thereon.

2. A range finder bracket adapted to be mounted on a camera and formed with a plate portion and resilient clips spaced from said plate portion and cooperating therewith to engage the base of a range finder to detachably secure the latter in position on said camera, a pair of spaced leaf springs extending along opposite sides of said base plate and positioned under said clips to prevent accidental bending thereof, said leaf spring being arranged to yieldably engage said base to center the base laterally on said plate portion, stop portions on said leaf springs arranged in the path of said base to position the latter longitudinally on said plate portion, and a flat member connecting said leaf springs and secured to said plate portion.

3. A centering spring for a range finder bracket comprising, in combination, a pair of substantially parallel, resilient portions arranged to engage the side edges of the base of a detachable range finder to center the base laterally on said bracket, offset portions on said resilient portions for positioning said base longitudinally on said bracket, and a flat washer connecting the ends of said resilient portions for mounting said centering spring on said bracket.

4. A centering spring for a range finder bracket comprising a strip of sheet material formed to provide a flat portion for mounting said spring to said bracket, a pair of spaced leaf springs bent up from the opposite sides of said flat portion and extending in substantially parallel relation to engage the base of a pocket range finder to center the base laterally on said bracket, and offset portions on said leaf springs adjacent said flat portion for engaging said base to position the latter longitudinally on said bracket.

HENRY O. DROTNING.